(12) United States Patent
Fay

(10) Patent No.: US 7,733,858 B1
(45) Date of Patent: Jun. 8, 2010

(54) COMMUNICATION PROTOCOL BETWEEN A HOST COMPUTER AND A CONTROL SURFACE IN AN AUDIO EDITING/MIXING SYSTEM

(75) Inventor: Edward G. Fay, Sonoma, CA (US)

(73) Assignee: Avid Technology, Inc., Tewksbury, MA (US)

( * ) Notice: Subject to any disclaimer, the term of this patent is extended or adjusted under 35 U.S.C. 154(b) by 1052 days.

(21) Appl. No.: 11/104,081

(22) Filed: Apr. 12, 2005

(51) Int. Cl.
*H04L 12/28* (2006.01)
*H04L 12/56* (2006.01)
*G06F 17/00* (2006.01)

(52) U.S. Cl. .................................... 370/389; 700/94
(58) Field of Classification Search .................... 700/94
See application file for complete search history.

(56) References Cited

U.S. PATENT DOCUMENTS

| | | | | |
|---|---|---|---|---|
| 5,524,060 | A * | 6/1996 | Silfvast et al. | 381/104 |
| 6,182,125 | B1 * | 1/2001 | Borella et al. | 709/218 |
| 7,245,727 | B2 * | 7/2007 | Cresci et al. | 381/119 |
| 2002/0026256 | A1 * | 2/2002 | Hilton | 700/94 |
| 2002/0082732 | A1 * | 6/2002 | Suyama et al. | 700/94 |
| 2005/0159832 | A1 * | 7/2005 | Umeo et al. | 700/94 |

OTHER PUBLICATIONS

J. van der Meer et al., RFC-3640: RTP Payload Format for Transport of MPEG-4 Elementary Streams, Nov. 2003, Network Working Group, pp. 6, 15, 19.*
DARPA, RFC 791: Internet Protocol, Sep. 1981, Information Sciences Institute, University of Southern California, pp. 12-13.*
Ross, Keith, et al., "3.3 Connectionless Transport: UDP", http://gaia.cs.umass.edu/kurose/transport/UDP.html, 1996-2000 (from web archive of Mar. 2002).*
Postel, J., "RFC-768: User Datagram Protocol", Information Sciences Institute, University of Southern California, Aug. 28, 1980.*
Information Sciences Institute, University of Southern California, "RFC-793: Transmission Control Protocol", pp. 1-10, Sep. 1981.*

(Continued)

*Primary Examiner*—Daniel J. Ryman
*Assistant Examiner*—Cassandra Decker
(74) *Attorney, Agent, or Firm*—Oliver Strimpel

(57) ABSTRACT

A control surface has a network connection for connecting to a host computer and has an address and an input for communicating data with the host computer. The network interface processes packets received from the host computer. Packets received include a first type and a second type, and the type is indicated by data in the packet. Upon receipt of a packet of the first type an acknowledgment packet is sent. Upon receipt of a packet of the second type, an acknowledgment packet is not sent. The packets of the second type include at least status information for a plurality of meters in the audio control surface. The status of the meters on the audio control surface is overwritten with the status information provided in any packets of the second type.

20 Claims, 3 Drawing Sheets

OTHER PUBLICATIONS

Kohler et al., Datagram Congestion Control Protocol (DCCP), Internet Engineering Task Force, Nov. 14, 2004, http://tools.ietf.org/html/draft-ietf-dccp-spec-09, p. 14-36.*

Palowireless Wireless Resource Center, Bluetooth Glossary, http://www.palowireless.com/infotooth/glossary.asp, Jan. 2001.*

Protocol Ethernet Protocol, Firmware version 1.00, Jun. 1, 1998, pp. 1-3.

Protocol Midi Protocol, Firmware version 1.00, Jun. 1, 1998, pp. 1-13.

* cited by examiner

COMMUNICATION PROTOCOL BETWEEN A HOST COMPUTER AND A CONTROL SURFACE IN AN AUDIO EDITING/MIXING SYSTEM

BACKGROUND

In the production of music and sound, musicians and sound engineers create audio compositions that include sequences of multiple channels of audio data. To create such compositions, musicians and sound engineers need to adjust levels and apply other effects to multiple channels of audio data. Musicians and sound engineers typically use a digital audio workstation for these tasks.

A digital audio workstation typically includes a host computer that may include peripherals for audio processing. Software on the host computer keeps track of both data files that store the multiple channels of audio data and the various parameters used to combine them into a composition. The software also performs audio processing functions and provides a graphical user interface to assist the musician or sound engineer to manipulate the composition.

A digital audio workstation also sometimes includes a control surface that provides a tactile user interface through which the musician or sound engineer manipulates the composition. Such control surfaces often include numerous mechanical control devices including, but not limited to, rotary encoders, potentiometers, faders, loop controllers, joysticks, touchpads, and switches, etc. Such control surfaces often include numerous display devices including, but not limited to, light emitting diode (LED) displays, alphanumeric displays and graphical displays. For example, each rotary encoder may be surrounded by a ring of LEDs that displays the setting defined by the position of the rotary encoder.

Information from the control devices is periodically sent to the host computer for use in editing or playback of the composition. Information from the host computer is periodically sent to the control devices to update the displays. Control surfaces connect to host computers through a number of different mechanisms, including, but not limited to networks, such as Ethernet, and busses, such as a MIDI serial bus and a universal serial bus (USB).

In large control surfaces, there may be a large number of control devices and display devices. Thus, a significant amount of bandwidth is used to exchange information between the host computer and the control surface.

For example, the Pro Control control surface from Digidesign (a division of Avid Technology, Inc.) connects to the Pro Tools software from Digidesign through an Ethernet connection. Ethernet protocol packets encapsulate MIDI data representing the control information and display information. In this interface, to ensure reliable packet delivery, packets are check summed and acknowledged. If an acknowledgement is not received in a reasonable period of time, the packet is retransmitted. No other packet is transmitted until an acknowledgement is received. If a packet is retransmitted several times, the connection is presumed to be broken.

With a large number of control and display devices, MIDI formatted messages are inefficient, because they carry only 7-bit data. Also, the use of acknowledgement messages introduces delay and reduces the utilization of the network connection between the host and the control surface.

SUMMARY

To provide more efficient communication between a host computer and a control surface over a network, a protocol uses packets that encapsulate messages in a binary format. Such packets include messages having a message identifier and a message length followed by a message body. For high bandwidth status information, such as sets of LED meters, the message body includes bytes of data indicating a region of the control surface, identifiers of display devices and state information for those display devices. Packets of this type are not acknowledged, whereas packets for other types of information are acknowledged, which permits the host computer and the control surface to still detect whether the connection has been broken. Because the high bandwidth status information includes an absolute state of each display device, rather than an update from a previous state, the correct state of the display device can be recovered from subsequent messages even if packets are lost.

Accordingly, a control surface has a network connection for connecting to a host computer and has an address and an input for communicating data with the host computer. The network interface processes packets received from the host computer. Packets received include a first type and a second type, and the type is indicated by data in the packet. Upon receipt of a packet of the first type an acknowledgment packet is sent. Upon receipt of a packet of the second type, an acknowledgment packet is not sent. The packets of the second type include at least status information for a plurality of meters in the audio control surface. The status of the meters on the audio control surface is overwritten with the status information provided in any packets of the second type.

DETAILED DESCRIPTION

Figure 1:
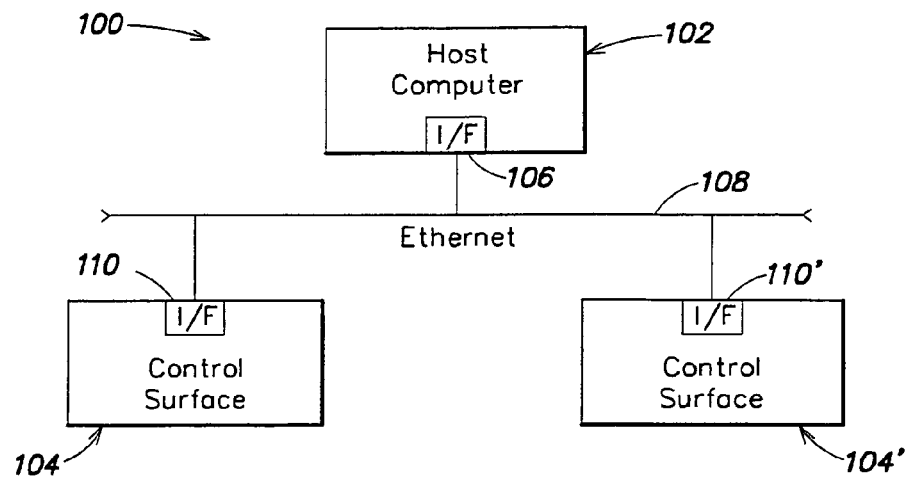
FIG. 1 is a block diagram of a digital audio workstation including a host computer connected to a control surface over a network.

Referring now to FIG. 1, an example digital audio workstation will now be described. This digital audio workstation 100 includes a host computer 102 and one or more control surfaces 104. The host computer 102 has an interface 106 that connects the host computer to a network 108, such as an Ethernet network. The control surface 104 also includes a network interface 110 that connects the control surface to the network 108. Other devices (not shown) also may connect to the network 108 through similar interfaces.

The host computer 102 is typically a general purpose computer running a commercially available operating system such as a WINDOWS, MAC or LINUX operating system. The host computer may include peripherals for audio processing, such as peripherals that include multiple digital signal processing (DSP) chips that can perform a variety of audio processing operations under software control. Software on the host computer keeps track of both data files that store multiple channels of audio data and various parameters used to combine them into a composition. The software also may direct a processor in the host computer to perform audio processing functions. The software also provides a graphical user interface to assist the musician or sound engineer to manipulate the composition. An example of such software includes the Pro Tools software from Digidesign, a division of Avid Technology, Inc.

Figure 2:
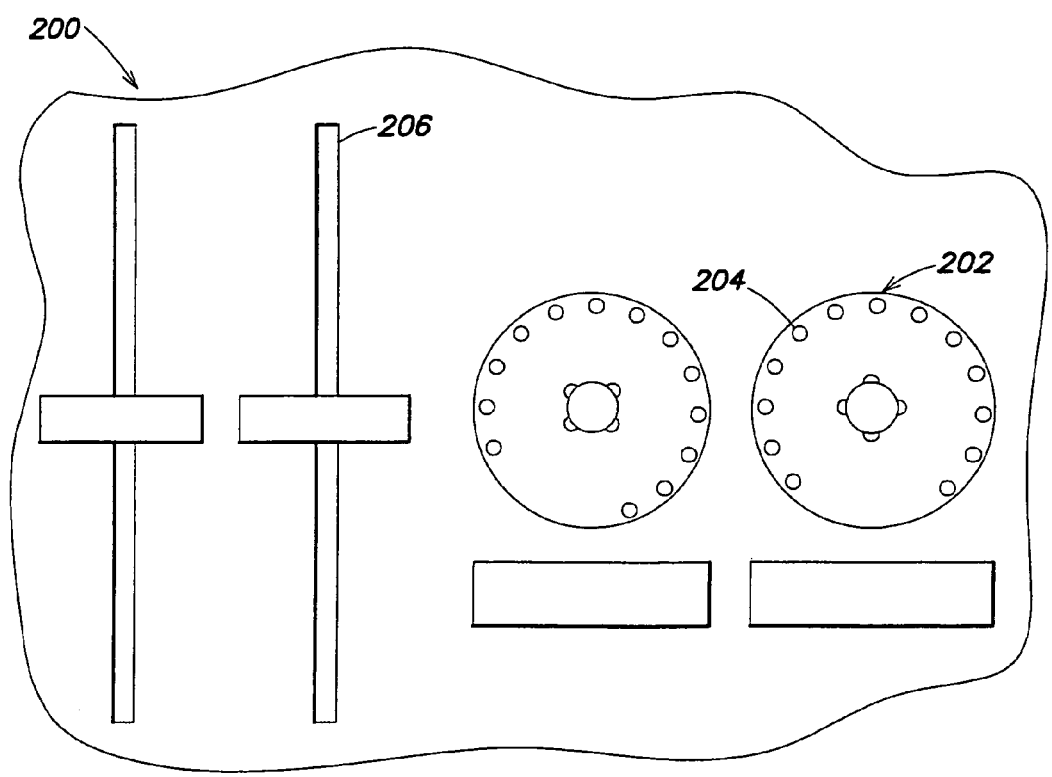
FIG. 2 is an illustrative schematic diagram of a control surface.

The control surface 104 provides a mechanical user interface through which a musician or sound engineer manipulates the composition. Such control surfaces often include numerous mechanical control devices including, but not limited to, rotary encoders, potentiometers, faders, loop controllers, joysticks, touchpads, etc. Such control surfaces often include numerous display devices including, but not limited to, LED displays, alphanumeric displays and graphical displays. As an example, as shown in FIG. 2, a control surface 200 may include one or more rotary encoders 202. A rotary encoder may be surrounded by a ring 204 of LEDs that are used to display the setting defined by the position of the rotary encoder. A control surface also may include, as an example, one or more faders 206. A variety of other control and display devices may exist on a control surface, and thus the control surface described in FIG. 2 is intended to be merely illustrative. Most control surfaces include a large number of such control and display devices.

Information from the control devices is periodically sent to the host computer for use in editing or playback of the composition. Information from the host computer is periodically sent to the control devices to update the displays. To provide more efficient communication between a host computer and a control surface over a network, a protocol uses packets that encapsulate messages in a binary format. Such packets include messages having a message identifier and a message length followed by a message body. For high bandwidth status information, such as sets of LED meters, the message body includes bytes of data indicating a region of the control surface, identifiers of display devices and state information for those display devices. Packets of this type are not acknowledged, whereas packets for other types of information are acknowledged, which permits the host computer and the control surface to still detect whether the connection has been broken. Because the high bandwidth status information includes an absolute state of each display device, rather than an update from a previous state, the correct state of the display device can be recovered from subsequent messages even if packets are lost.

Figure 3A:
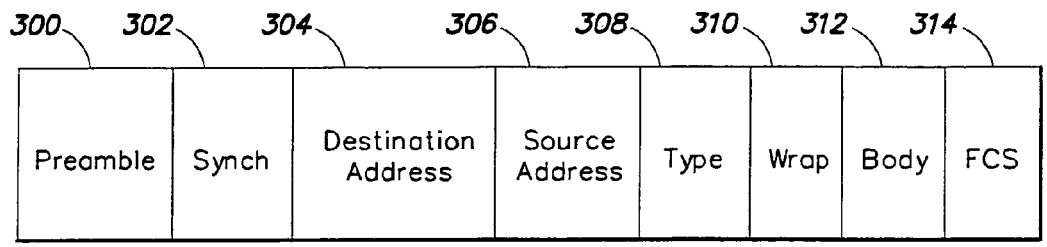
FIGS. 3A-3C illustrate the structure of packets sent over the network between a host computer and a control surface.

An Ethernet data frame format will now be described in more detail in connection with FIGS. 3A-3C. In FIG. 3A, the Ethernet data frame includes a preamble field 300 of 62 bits, followed by 2 bits of synchronization information 302, thus providing 8 bytes. A destination address 304 and source address 306, of 6 bytes each, follow. An ethernet type field 308 of 2 bytes is then provided. A wrap field 310 (16 bytes) and a body field 312 (30-1484 bytes), described in more detail below, contain one or more messages. The last field, an FCS field 314, is 4 bytes. This field contains the Frame Check Sequence (FCS) which is calculated using a Cyclic Redundancy Check (CRC). The FCS allows the Ethernet to detect errors in the Ethernet frame and reject the frame if it appears damaged. The combination of the destination address 304, source address 306, type 308, wrap 310 and body fields 312 is considered a packet. A packet may include one or more messages, as defined by the wrap field 310.

Figure 3B:
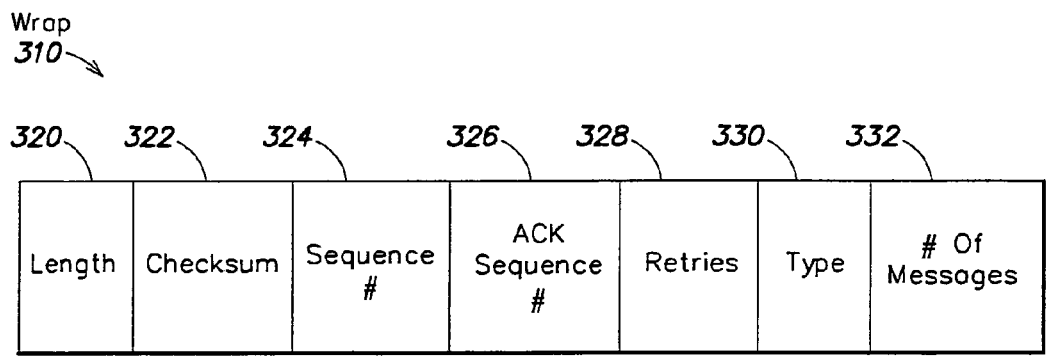

The wrap field, as shown in FIG. 3B, includes a length field 320 of 2 bytes indicating the combined length of the wrap and body fields. A checksum field 322 of 2 bytes stores a checksum of the body. To permit acknowledgements, 4 bytes is used for each of a sequence number 324 (uniquely generated by the sender for a message) and an acknowledge sequence number 326 (which is set by the destination in an acknowledgement to a message from the sender). The retries field 328 of 2 bytes indicates how many times the packet has been sent because an acknowledgement was not received. The packet type field 330 of 1 byte distinguishes among control packets (such as for establishing a connection), normal packets containing messages that require acknowledgement, and normal packets that do not require acknowledgement. The number of messages field 332 is 1 byte and indicates the number of messages in the body.

Figure 3C:
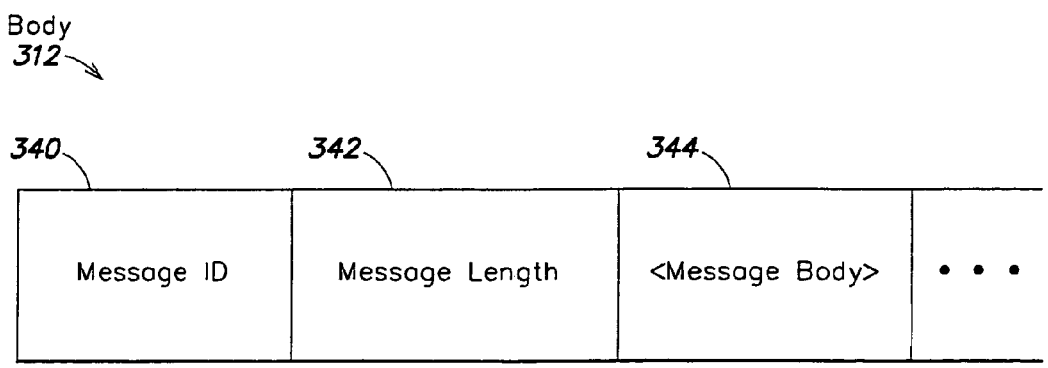

The body, as shown in FIG. 3C, includes one or more messages. Each message includes a message identifier field 340, a message length field 342 and the body 344 of the message. The message body 344 is in a binary format instead of a MIDI format.

For high bandwidth status information, such as sets of LED meters, the message body includes bytes of data indicating a region of the control surface, identifiers of display devices and state information for those display devices. Packets of this type are not acknowledged, whereas packets for other types of information are acknowledged, which permits the host computer and the control surface to still detect whether the connection has been broken. Because the high bandwidth status information includes an absolute state of each display device, rather than an update from a previous state, even if packets are lost, the correct state of the display device can be recovered from subsequent messages.

All messages in a packet are of the same type. Messages of different types (broadcast, non-acknowledged and acknowledged) are not mixed in a packet. Messages for different control surfaces are not mixed in a packet. To achieve this, the host can create different transport objects. In particular, a transport object for non-acknowledged packets and a transport object for acknowledged packets is created by the host for each control surface with which it communicates. The host also creates a transport object for broadcast packets. Messages sent by the host are routed to the appropriate transport object. If no acknowledgement is required for a message, the message is sent as soon as possible in a packet. If an acknowledgement is required for a message, then the host waits for any outstanding acknowledgement for another message to be received before the message is sent, possibly with other messages that may have been queued while the host is waiting.

The body of the message for such high bandwidth status information, for example, for Track Meter messages and Master Meter messages may include the following. The Track Meter and Master Meter messages are combined for efficiency and include 32 segments per meter. Notably, these meters are tri-color with two independent LEDs (green/red), and each individual LED can have its own color. Thus, a significant amount of data is used to define the state of each meter. Thus, a track meter message is 260 bytes and a master meter message is 68 bytes long. The formats for these messages is as follows:

Track Meter message (const short cPC2_App2HWCTrackMeterMessageDataLen=260)
    data[0]=ePC2_App2HWCTrackMeterMessage
    data[1]=cPC2_App2HWCTrackMeterMessageDataLen
    data[2]=region
    data[3]=id
    data[4]=green led states 0-7 top->bottom
    data[5]=green led states 8-15
    data[6]=green led states 9-23
    data[7]=green led states 24-31
    data[8]=red led states 0-7 top->bottom
    data[9]=red led states 8-15 data[10]=red led states 9-23
data[11]=red led states 24-31
... 8 bytes×32 meters
data[259]

Master Meter message (const short cPC2_App2HWCMasterMeterMessageDataLen=68)
data[0]=ePC2_App2HWCMasterMeterMessage
data[1]=cPC2_App2HWCMasterMeterMessageDataLen
data[2]=region
data[3]=id
data[4]=green led states 0-7 top->bottom
data[5]=green led states 8-15
data[6]=green led states 9-23
data[7]=green led states 24-31
data[8]=red led states 0-7 top->bottom
data[9]=red led states 8-15
data[10]=red led states 9-23
data[11]=red led states 24-31
... 8 bytes×8 meters
data[67]

Figure 4:
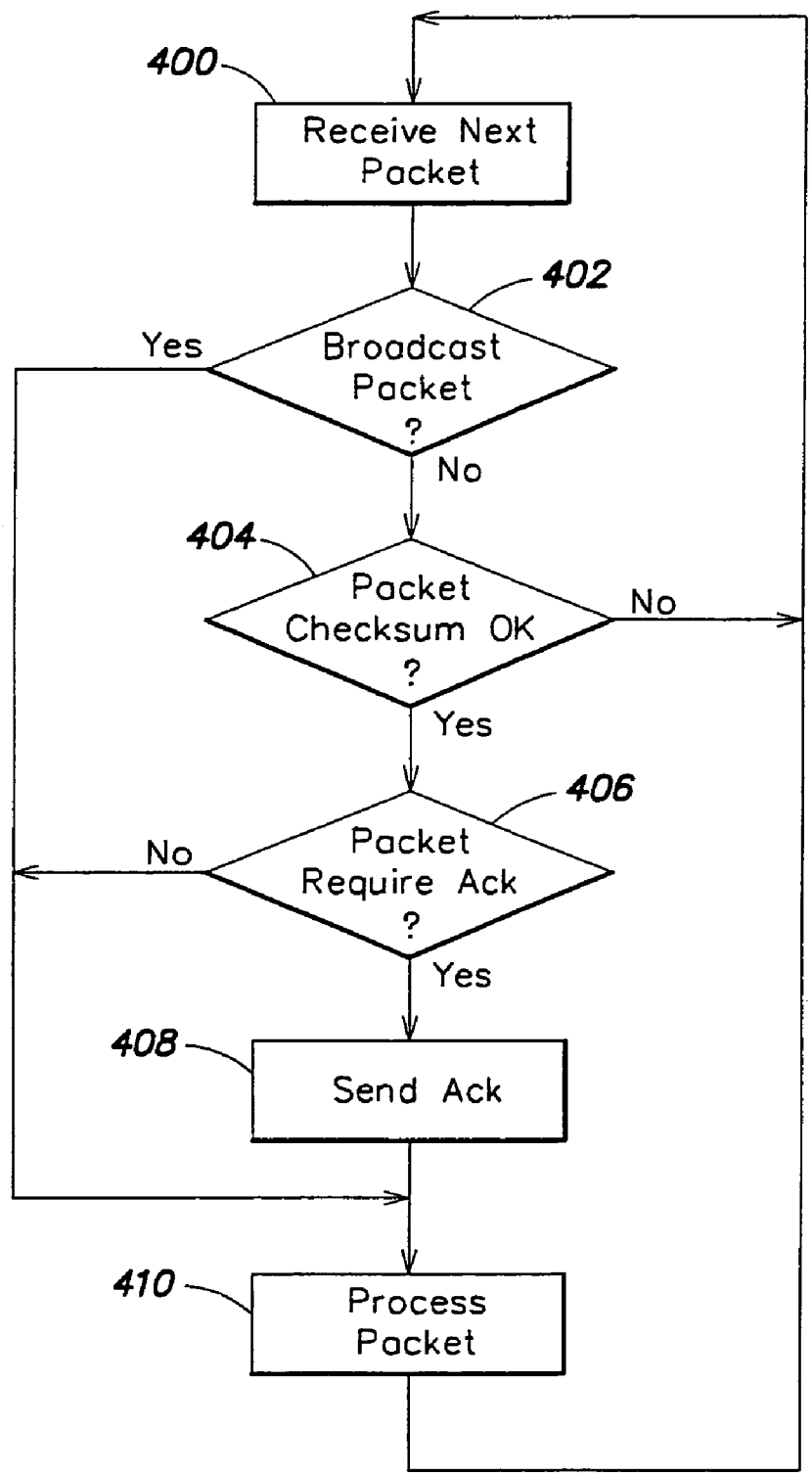
FIG. 4 is a flowchart describing packet processing by the control surface.

Having now described the message format, a flowchart (FIG. 4) describing the processing of messages by a controller of the control surface will now be described. The control surface starts in a state in which it is ready to receive 400 the next packet received by its network interface. When the next packet is received, if the message is a broadcast message, as determined at 402, the packet is processed 410, and the control surface returns to its ready state in 400. If a received message is not a broadcast message, the packet checksum is verified at 404. If the checksum is not valid, then the message is dropped and the control surface returns to its ready state 400. If the non-broadcast message has a valid checksum, and if the packet does not require an acknowledgement (as determined at 406 by examination of the packet type field), the packet is processed 410, and the control surface returns to its ready state 400. If the received message requires an acknowledgement, then an acknowledgement is sent (408). Then the packet is processed 410 and the control surface returns to its ready state 400.

With the foregoing process, for high bandwidth status information, such as sets of LED meters, the message body includes bytes of data indicating a region of the control surface, identifiers of display devices and state information for those display devices. Packets of this type are not acknowledged, permitting more efficient communication. Packets for other types of information are acknowledged, which permits the host computer and the control surface to still detect whether the connection has been broken.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An audio control surface comprising:
    a memory;
    a plurality of meters;
    a network interface for connecting to a network and providing a network connection for communicating with a host computer, and having an address and an input for communicating data with the host computer;
    a processor connected to the memory, the network interface and the plurality of meters, and configured to:
    process packets received through the network interface from the host computer, wherein the packets received include a first type and a second type, wherein after receipt of a packet of the first type the processor sends an acknowledgment packet through the network interface to the host computer, and wherein after receipt of a packet of the second type an acknowledgment packet is not sent to the host computer; and
    in response to each packet of the second type, update any meters affected by the each packet in the plurality of meters with state information provided in the each packet;
    wherein packets of the first and second types comprise:
    a wrap field, including a packet type field, wherein data in the packet type field indicates a type from among a plurality of types, wherein the plurality of types comprises the first type and the second type, and
    a body field comprising one or more messages, each message in a packet of the second type including state information for meters among the plurality of meters.

2. The audio control surface of claim 1, wherein the state information in packets of the second type includes an absolute state of the meters affected by the packets.

3. The audio control surface of claim 1, wherein the network connection is an Ethernet connection.

4. The audio control surface of claim 1, further comprising a mechanical control device.

5. The audio control surface of claim 1, further comprising a display device.

6. The audio control surface of claim 1, further comprising a mechanical control device and a display device.

7. A digital audio workstation, comprising:
    a host computer having a network connection connected to a network;
    a control surface having a network interface for connecting to the network and providing a network connection for communicating with the host computer over the network, wherein the control surface has an address and an input for communicating data with the host computer;
    wherein the control surface further comprises:
    a memory;
    a plurality of meters;
    a processor connected to the memory, the network interface and the plurality of meters, and configured to:
    process packets received through the network interface from the host computer, wherein the packets received include a first type and a second type, wherein after receipt of a packet of the first type the processor sends an acknowledgment packet through the network interface to the host computer, and wherein after receipt of a packet of the second type an acknowledgment packet is not sent to the host computer; and
    in response to each packet of the second type, update any meters affected by the each packet in the plurality of meters with state information provided in the each packet;
    wherein packets of the first and second types comprise:
    a wrap field, including a packet type field, wherein data in the packet type field indicates a type from among a plurality of types, wherein the plurality of types comprises the first type and the second type, and
    a body field comprising one or more messages, each message in a packet of the second type including state information for meters among the plurality of meters.

8. The digital audio workstation of claim 7, wherein the state information in packets of the second type includes an absolute state of the meters affected by the packets.

9. The digital audio workstation of claim 7, wherein the network connection is an Ethernet connection.

10. The digital audio workstation of claim 7, further comprising a mechanical control device.

11. The digital audio workstation of claim 7, further comprising a display device.

12. The control surface of claim 7, further comprising a mechanical control device and a display device.

13. The digital audio workstation of claim 7, wherein the packets received further comprise a header including an Ethernet packet type field, and wherein the packets received are Ethernet packets.

14. The digital audio workstation of claim 13, wherein the state information in packets of the second type includes an absolute state of the meters affected by the packets.

15. The digital audio workstation of claim 7, wherein each message comprises:
 a message length field and a message body.

16. The digital audio workstation of claim 7, wherein the wrap field comprises:
 a length field indicating a combined length of the wrap field and the body field; and
 a number of messages field indicating a number of messages in the body field.

17. The digital audio workstation of claim 16, wherein each message comprises:
 a message length field and a message body.

18. The digital audio workstation of claim 17, wherein the wrap field comprises:
 one or more fields including data for managing acknowledgements of packets.

19. The digital audio workstation of claim 16, wherein the wrap field comprises:
 one or more fields including data for managing acknowledgements of packets.

20. A digital audio workstation, comprising:
 a host computer having a network connection connected to a network;
 a control surface having a network interface for connecting to the network and providing a network connection for communicating with the host computer over the network, wherein the control surface has an address and an input for communicating data with the host computer;
 wherein the control surface further comprises:
 a memory;
 a plurality of meters;
 a processor connected to the memory, the network interface and the plurality of meters, and configured to:
 process packets received through the network interface from the host computer, wherein the packets received include a first type and a second type, wherein after receipt of a packet of the first type the processor sends an acknowledgment packet through the network interface to the host computer, and wherein after receipt of a packet of the second type an acknowledgment packet is not sent to the host computer; and
 in response to each packet of the second type, update any meters affected by the each packet in the plurality of meters with state information provided in the each packet;
 wherein each packet received comprises:
 a first packet type field indicative of a network protocol type;
 a wrap field, including a second packet type field, wherein data in the second packet type field indicates a type from among a plurality of types, wherein the plurality of types comprises the first type and the second type; and
 a body field comprising one or more messages, each message in packets of the second type including state information for meters among the plurality of meters.

* * * * *